(12) United States Patent
Kobayashi et al.

(10) Patent No.: US 10,935,448 B2
(45) Date of Patent: Mar. 2, 2021

(54) PRESSURE DETECTION DEVICE WITH IMPROVED EXTERNAL NOISE MEASUREMENT REDUCTION

(71) Applicants: Nidec Tosok Corporation, Zama (JP); Nippon Seiki Co., Ltd., Nagaoka (JP)

(72) Inventors: Yoshiyuki Kobayashi, Zama (JP); Shigehiro Kataoka, Zama (JP); Yoshihiro Kamimura, Nagaoka (JP)

(73) Assignees: NIDEK TOSOK CORPORATION, Zama (JP); NIPPON SEIKI CO., LTD., Nagaoka (JP)

( * ) Notice: Subject to any disclaimer, the term of this patent is extended or adjusted under 35 U.S.C. 154(b) by 227 days.

(21) Appl. No.: 16/075,785

(22) PCT Filed: Feb. 10, 2017

(86) PCT No.: PCT/JP2017/004968
§ 371 (c)(1),
(2) Date: Aug. 6, 2018

(87) PCT Pub. No.: WO2017/138647
PCT Pub. Date: Aug. 17, 2017

(65) Prior Publication Data
US 2019/0064025 A1 Feb. 28, 2019

(30) Foreign Application Priority Data
Feb. 10, 2016 (JP) .................................. 2016-023709

(51) Int. Cl.
*G01L 19/14* (2006.01)
*G01L 19/06* (2006.01)
(Continued)

(52) U.S. Cl.
CPC ............ *G01L 19/14* (2013.01); *G01L 9/0054* (2013.01); *G01L 9/12* (2013.01); *G01L 19/0645* (2013.01); *G01L 19/144* (2013.01)

(58) Field of Classification Search
None
See application file for complete search history.

(56) References Cited

U.S. PATENT DOCUMENTS

| | | | | |
|---|---|---|---|---|
| 7,036,385 B2* | 5/2006 | Murai | ................. | G01L 19/0084 73/756 |
| 7,426,868 B2* | 9/2008 | Fessele | ................. | G01L 19/069 73/706 |
| 8,272,272 B2* | 9/2012 | Gebauer | ............. | G01L 19/0084 73/753 |

FOREIGN PATENT DOCUMENTS

| | | |
|---|---|---|
| JP | 2002-257663 | 9/2002 |
| JP | 2005-265667 | 9/2005 |

(Continued)

OTHER PUBLICATIONS

International Search Report, dated Mar. 14, 2017 (dated Mar. 14, 2017), 3 pages.

*Primary Examiner* — Lisa M Caputo
*Assistant Examiner* — Nigel H Plumb
(74) *Attorney, Agent, or Firm* — Rankin, Hill & Clark LLP (57) ABSTRACT

A pressure detection device includes a base plate having first and second principal surfaces and a through-hole in which a fluid to be measured flows. A pressure sensor arranged above the first principal surface to cover the through-hole outputs an electric signal corresponding to the pressure of the fluid. A housing includes a recessed portion and first and second capacitor holders. The recessed portion retains the base plate and first and second lead terminals electrically connected to the pressure sensor and allows a part of each of the lead (Continued)

terminals to be exposed. The capacitor holders each includes an outwardly opened recess and together hold a capacitor electrically connected to the lead terminals. Each of the capacitor holders obliquely protrudes from an outer shape of the housing to both sides when viewed in a plan view in a direction from the first principal surface to the second principal surface.

19 Claims, 5 Drawing Sheets

(51) Int. Cl.
*G01L 9/00* (2006.01)
*G01L 9/12* (2006.01)

(56) References Cited

FOREIGN PATENT DOCUMENTS

| | | |
|---|---|---|
| JP | 2007-501937 | 2/2007 |
| JP | 2011-033531 | 2/2011 |
| JP | 2011-510276 | 3/2011 |
| JP | 2014-211391 | 11/2014 |

\* cited by examiner

PRESSURE DETECTION DEVICE WITH IMPROVED EXTERNAL NOISE MEASUREMENT REDUCTION

TECHNICAL FIELD

The present disclosure relates to a pressure detection device and a method for manufacturing the pressure detection device.

BACKGROUND ART

Pressure detection devices have been used for measuring the pressure of a fluid such as a gas or a liquid. Patent Literature 1 discloses a pressure detection device including: a metal base plate including a pressure inlet; a pressure sensor that receives fluid pressure through a pressure inlet formed in the base plate; a circuit board that is connected to the pressure sensor through wire bonding; and capacitors that are mounted on the circuit board and remove exogenous noise arriving at a semiconductor-type pressure sensor.

CITATION LIST

Patent Literature

Patent Literature 1: Unexamined Japanese Patent Application Kokai Publication No. 2002-257663

SUMMARY OF INVENTION

Technical Problem

In the pressure detection device disclosed in Patent Literature 1, the capacitors mounted on the circuit board are connected between an electrode terminal for a power supply and an electrode terminal for a ground, and between an electrode terminal for an output and the electrode terminal for a ground, respectively. Accordingly, the pressure detection device requires the circuit board, a storage space and the number of components are increased according to the circuit board, and the size of the pressure detection device is increased.

The present disclosure was made under such actual circumstances with an objective of providing: a pressure detection device of which the number of components is small, and which is small; and a method for manufacturing the pressure detection device.

Solution to Problem

In order to achieve the above-described objective, a pressure detection device of the present disclosure includes:

a base plate that includes a first principal surface, a second principal surface located on the back of the first principal surface, and a through-hole in which a fluid to be measured flows, the through-hole penetrating the base plate from the first principal surface to the second principal surface;

a pressure sensor that is arranged above the first principal surface to cover the through-hole of the base plate and outputs an electric signal corresponding to the pressure of the fluid to be measured in the through-hole;

a lead terminal that is electrically connected to the pressure sensor;

a housing that includes a recessed portion that retains the base plate and the lead terminal and allows a part of the lead terminal to be exposed; and a capacitor holder that includes an outwardly opened recess and holds a capacitor; and the capacitor that is held by the capacitor holder of the housing and is electrically connected to the lead terminal.

In order to achieve the above-described objective, a method for manufacturing a pressure detection device of the present disclosure includes:

a step of performing insert molding of a lead terminal and a base plate that includes a first principal surface, a second principal surface located on the back of the first principal surface, and a through-hole in which a fluid to be measured flows, the through-hole penetrating the base plate from the first principal surface to the second principal surface, and of molding a housing that includes a recessed portion that allows a part of the lead terminal to be exposed; and a capacitor holder communicating with the recessed portion;

a step of fixing a pressure sensor above the first principal surface of the base plate to cover the through-hole, the pressure sensor outputting an electric signal corresponding to the pressure of the fluid to be measured in the through-hole, and of electrically connecting the lead terminal and the pressure sensor to each other;

a step of inserting a capacitor body of a capacitor into the capacitor holder to arrange a leader of the capacitor in the recessed portion; and a step of connecting the leader and the lead terminal to each other in the recessed portion.

Advantageous Effects of Invention

According to the present disclosure, the connection of a capacitor held by a capacitor holder to a lead terminal retained by a recessed portion eliminates the need for a circuit board, and therefore, a small pressure detection device including a few components and a method for manufacturing the pressure detection device can be obtained.

DESCRIPTION OF EMBODIMENTS

Embodiment

A pressure detection device according to an embodiment of the present disclosure and a method for manufacturing the pressure detection device will be described below with reference to FIG. 1 to FIG. 6.

The pressure detection device 100 of the present embodiment includes: i) a base plate 10 that includes a first principal surface 11, a second principal surface 12 located on the back of the first principal surface 11, and a through-hole 13; ii) a pressure sensor 20 that is arranged on the first principal surface 11 to cover the through-hole 13 of the base plate 10 and that outputs an electric signal corresponding to the pressure of a fluid to be measured in the through-hole 13; iii) lead terminals 30 that are electrically connected to the pressure sensor 20; iv) a housing 40 that includes recessed portions 41 which retain the base plate 10 and the lead terminals 30, and which allow parts of the lead terminals 30 to be exposed; and v) a capacitor 50 that protects the pressure sensor 20 from static electricity.

Figure 1:
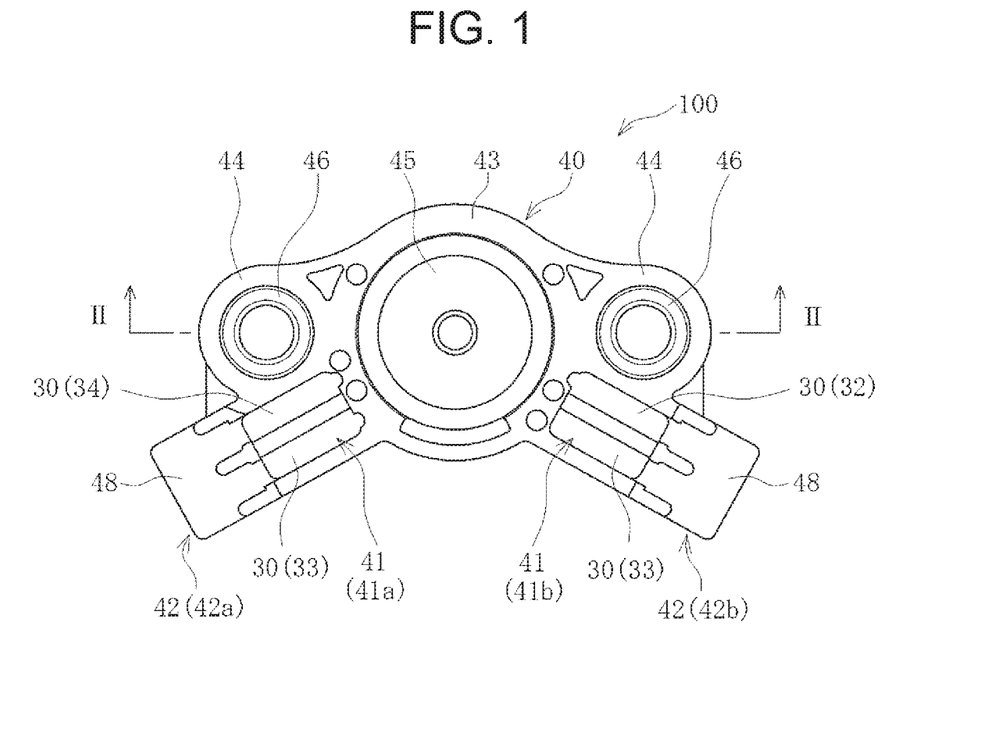
FIG. 1 is a plan view of a pressure detection device according to an embodiment of the present disclosure.

The housing 40 includes: a housing body 43 which is located in a center and formed in a roughly cylindrical shape; the recessed portions 41 and capacitor holders 42 which obliquely protrude from the center of the housing body 43 to both sides, are outwardly located, and are roughly rectangular as a whole; and fixers 44 which protrude from the center of the housing body 43 to both sides and are outwardly located, as illustrated in FIG. 1. The housing body 43 includes a lid member 45.

For distinction, one recessed portion 41 and one capacitor holder 42 in the left of the drawing are denoted by reference characters 41a and 42a, respectively, and the other recessed portion 41 and the other capacitor holder 42 in the right of the drawing are denoted by reference characters 41b and 42b, respectively.

The housing 40 is formed of a resin having electrical insulation properties, such as, for example, a poly phenylene sulfide (PPS) resin. The whole housing 40 including the recessed portions 41, the capacitor holders 42, the housing body 43, and the fixer 44 is integrally formed.

The housing body 43 houses the base plate 10, the pressure sensor 20, and the lead terminals 30.

As illustrated in FIG. 1, FIG. 3, FIG. 4, and FIG. 5, each of the recessed portions 41a and 41b is opened in the central axis direction of the housing body 43 (the direction from the first principal surface 11 of the base plate 10 toward the second principal surface 12) and allows parts of the lead terminals 30 housed in the housing body 43 and the leaders 52 of the capacitor 50 to be exposed. In this sense, the recessed portions 41 function as exposers.

Figure 3:
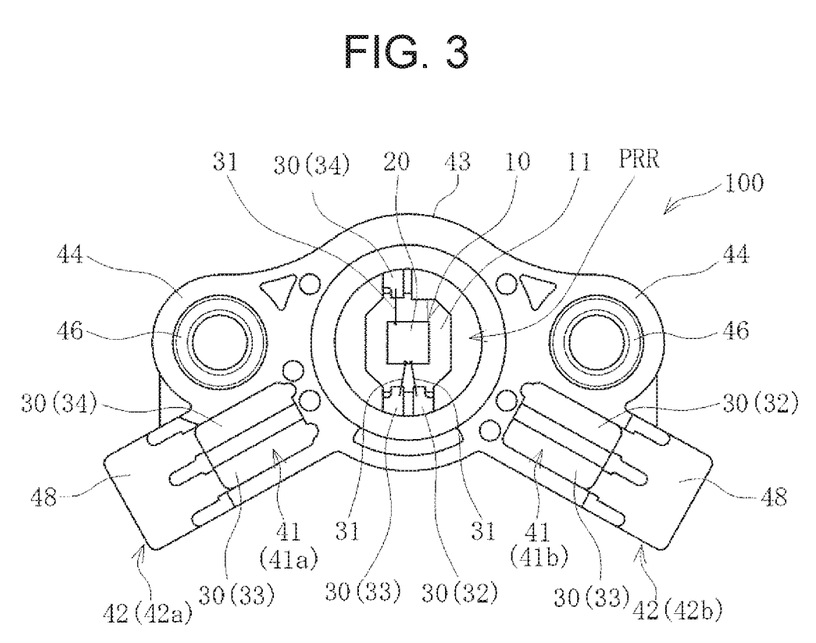
FIG. 3 is a plan view of the pressure detection device illustrated in FIG. 1, from which a lid member is removed.
Figure 4:
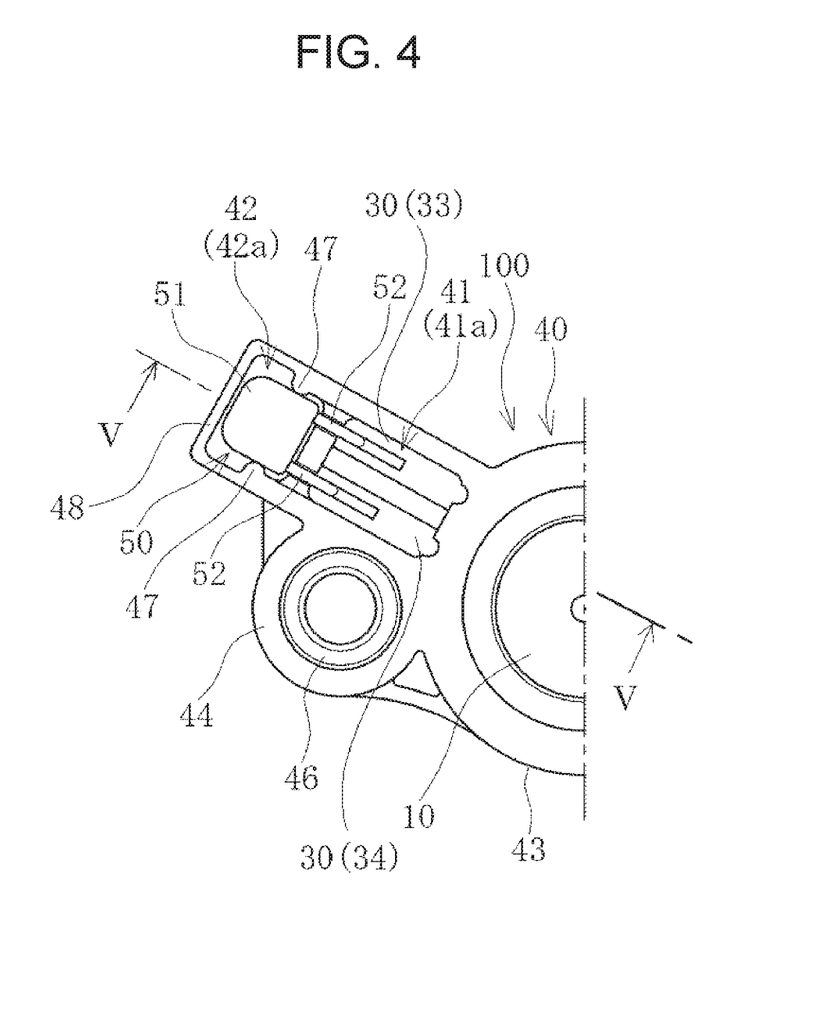
FIG. 4 is a fragmentary bottom view of a pressure detection device according to an embodiment.

As illustrated in FIG. 1, FIG. 3, FIG. 4, and FIG. 5, each of the capacitor holders 42a and 42b is formed in a recessed shape and houses the capacitor body 51 of the capacitor 50. The recesses of the capacitor holders 42 communicate with the openings of the recessed portions 41. The tip sections of the leaders 52 of the capacitor 50 housed in each of the capacitor holders 42 are arranged in the recessed portions 41 and are exposed. Each of the capacitor holders 42a and 42b is configured so that the mounted capacitor 50 of which the periphery is surrounded by a wall 48 can be fixed. Like the recessed portions 41, the capacitor holders 42a and 42b are opened in the central axis direction of the housing body 43 (the direction from the first principal surface 11 of base plate 10 toward the second principal surface 12). As a result, the capacitor 50 can be mounted from the outside (the back, closer to the second principal surface 12) of each of the capacitor holders 42a and 42b. The capacitor holders 42a and 42b are arranged at positions opposed to each other and each include a pair of projections 47 and 47 which press the mounted capacitor 50, as illustrated in FIG. 4.

Figure 2:
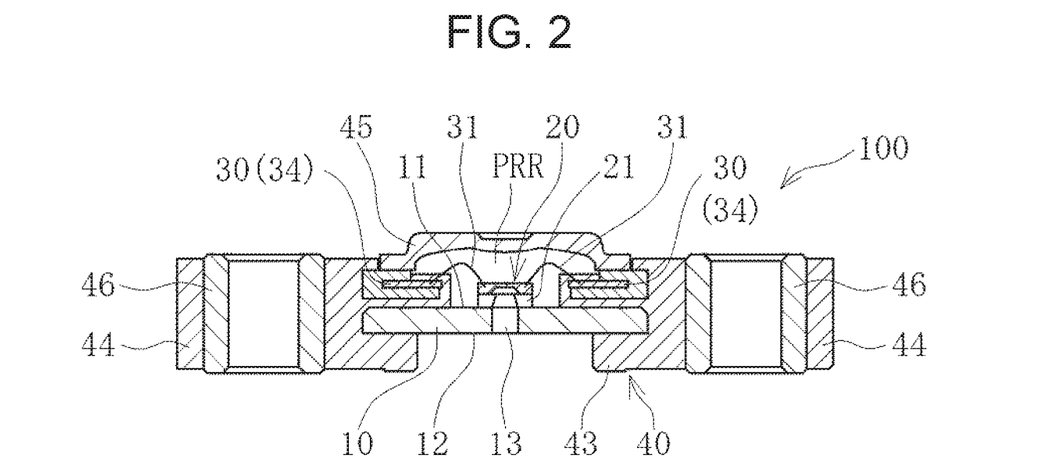
FIG. 2 is a cross-sectional view taken along the line II-II of FIG. 1.

The fixers 44 are arranged on both sides of the housing body 43, and a mounting hole is formed in each of the fixers 44, as illustrated in FIG. 1, FIG. 2, and FIG. 3. The fixer 44 is a portion for mounting the pressure detection device 100 on a body to be detected. The fixer 44 is reinforced by mounting a metallic collar 46 in the mounting hole.

The fixers 44 can be mounted on the outer periphery of a discoidal body to be detected by arranging the fixers 44 on both sides of the housing body 43. Insert molding of the base plate 10 and the lead terminals 30 is performed to the housing body 43. Insert molding of the metallic collar 46 such as, for example, brass is performed on the fixer 44.

The lid member 45 is a member for allowing a side (closer to the first principal surface 11 of the base plate 10) of housing body 43, opposite to a side closer to a fluid to be measured, to be in an airtight state, as illustrated in FIG. 1 and FIG. 2. The lid member 45 covers the back of a surface, receiving the pressure of the fluid to be measured, of the pressure sensor 20 of the housing body 43, thereby forming a sealed space and allowing the space to be a pressure reference room PRR. The lid member 45 includes, for example, a resin such as PPS, which is the same material as the material of the housing 40. The lid member 45 is fixed on the housing body 43 to seal the pressure reference room PRR by, for example, laser welding.

The base plate 10 is a metallic member that supports the pressure sensor 20. The base plate 10 is formed of a metallic material, such as, for example, 42 alloy, in a discoid shape. The base plate 10 includes the first principal surface 11 and the second principal surface 12 which is the back of the first principal surface 11, as illustrated in FIG. 2. The base plate 10 includes, in the center of the base plate 10, the through-hole (pressure inlet) 13 in which a fluid to be measured, such as an oil, flows. By, for example, insert molding, the base plate 10 is fixed to the housing 40 in an airtight state so that the outer periphery of the base plate 10 is interposed in the housing body 43. The strength of the base plate 10 is secured so that the base plate 10 supports the pressure sensor 20 and distortion is prevented from being generated due to the pressure of a fluid to be measured.

The pressure sensor 20 includes a one-chip semiconductor-type pressure sensor. The pressure sensor 20 includes a silicon wafer anodically bonded onto a glass base (first insulating layer) 21, as illustrated in FIG. 2 and FIG. 3. The pressure sensor 20 includes a Wheatstone bridge circuit formed on a silicon substrate. The Wheatstone bridge circuit converts, into a voltage signal, distortion resistance caused by a change in the pressure of the silicon substrate, and outputs the voltage signal. The pressure sensor 20 performs power supply and voltage output by the lead terminals 30 described later. The pressure sensor 20 is arranged on the first principal surface 11 of the base plate 10 to cover the through-hole 13 of the base plate 10. The base 21 of the pressure sensor 20 is airtightly fixed to the base plate 10 by die bond.

Insert molding of the lead terminals 30 is performed airtightly to the housing 40, as illustrated in FIG. 2 to FIG. 5. One ends of the lead terminals 30 are electrically connected to the pressure sensor 20 in the housing body 43 through wires 31, as illustrated in FIG. 2, and the other ends of the lead terminals 30 protrude to and are exposed to both the recessed portions 41 outside the housing body 43, as illustrated in FIG. 1, FIG. 2, FIG. 4, and FIG. 5. Each lead terminal 30 includes a lead terminal 32 for a power supply, a lead terminal 33 for a ground, and a lead terminal 34 for an output. The wires 31 through which the pressure sensor 20 and the lead terminals 30 are connected to each other includes, for example, a wire made of aluminum. Each of the lead terminals 32, 33, and 34 includes, for example, Ni-plated phosphor bronze or the like.

One recessed portion 41a retains the lead terminal 34 for an output and the lead terminal 33 for a ground in a state in which a part of the lead terminal 34 for an output and a part of the lead terminal 33 for a ground are exposed. The other recessed portion 41b retains the lead terminal 32 for a power supply and the lead terminal 33 for a ground in a state in which a part of the lead terminal 32 for a power supply and a part of the lead terminal 33 for a ground are exposed. A power supply voltage is applied to the lead terminal 32 for a power supply, and the lead terminal 33 for a ground is grounded. Then, a constant voltage is applied to the pressure sensor 20, thereby operating the Wheatstone bridge circuit. The Wheatstone bridge circuit outputs, to the lead terminal 34 for an output, a voltage corresponding to the distortion of the substrate of the pressure sensor 20, caused by the pressure of a fluid to be measured in the through-hole 13.

The capacitor 50 is intended to secure the proof stress against static electricity of the pressure sensor 20 of the pressure detection device 100. The capacitor 50 includes, for example, a chip capacitor. The capacitor 50 includes the capacitor body 51 and the leaders 52. As illustrated in FIG. 4, the capacitor 50 is formed so that the two leaders 52 are disposed to extend on the capacitor body 51 and protrude in the longitudinal direction of the capacitor body 51.

Figure 5:
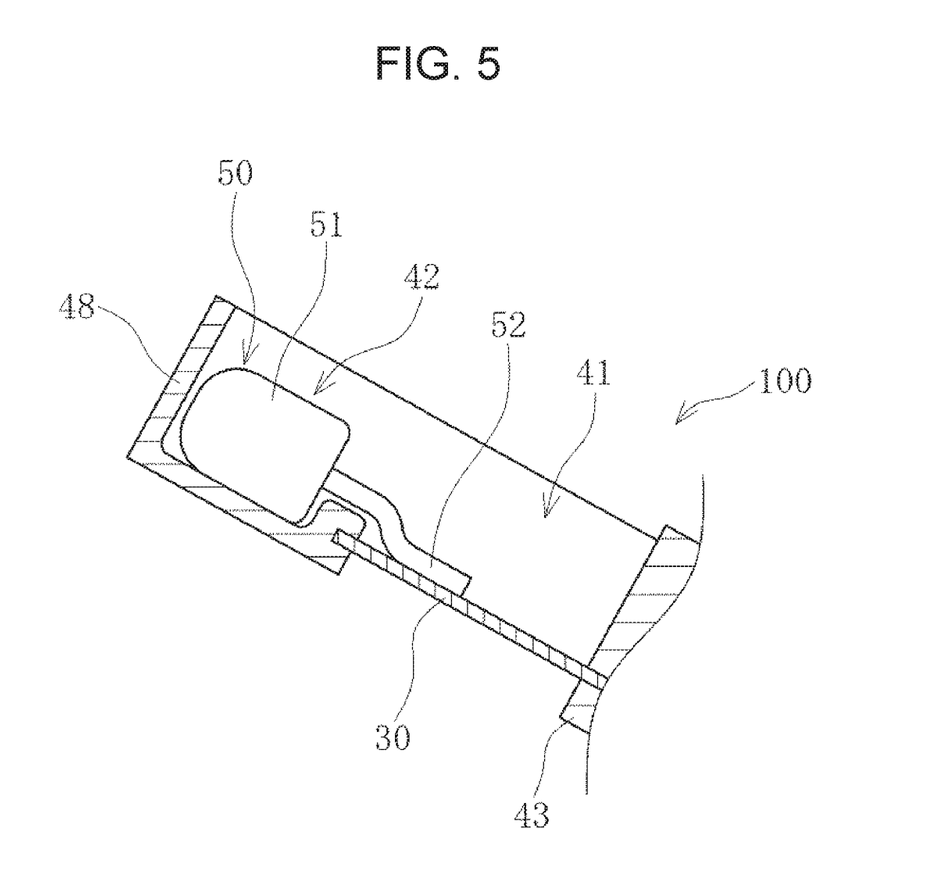
FIG. 5 is a partial cross-sectional view taken along the line V-V of FIG. 4.

The capacitors 50 are mounted and held in the capacitor holders 42a and 42b of the housing 40 from the back (a side closer to a fluid to be measured), as illustrated in FIG. 4 and FIG. 5. The capacitors 50 are held so that the leaders 52 and parts of the lead terminals 30 exposed to the recessed portions 41a and 41b communicating with the capacitor holders 42a and 42b come in contact with each other on the back. The capacitor bodies 51 are fixed to be surrounded by the walls 48 around the capacitor holders 42a and 42b.

In such a case, the capacitor bodies 51 are held by the projections 47 and 47, opposed to each other, of the recessed portions 41a and 41b, as illustrated in FIG. 4, and the walls 48 in the front (a side opposed to a side closer to a fluid to be measured), as illustrated in FIG. 5.

The leaders 52 of the capacitors 50 and the lead terminals 32, 33, and 34 are electrically bonded to each other in the recessed portions 41a and 41b by welding or the like. In the one recessed portion 41a, the one and other leaders 52 of the capacitor 50 are connected to the lead terminal 34 for an output and the lead terminal 33 for a ground, respectively. In the other recessed portion 41b, the one and other leaders 52 of the capacitor 50 are connected to the lead terminal 32 for a power supply and the lead terminal 33 for a ground, respectively. As a result, the proof stress against static electricity of the pressure sensor 20 is secured.

In the pressure detection device 100, parts of the lead terminals 30 disposed in the housing 40 by insert molding are exposed to the recessed portions 41, and the leaders 52 of the capacitors 50 held by the capacitor holders 42 are arrange in and connected to the exposed lead terminals 30. Accordingly, the housing of a circuit board in the housing 40 and the bonding of the capacitors 50 through the circuit board, as previously performed, are not required. Even when the capacitors 50 which allow pressure resistance to exogenous noise to be secured, the housing 40 can be made to be compact, and the size of the pressure detection device 100 in itself can be reduced.

The pressure detection device 100 is arranged along the discoidal outer periphery of a body to be detected, such as, for example, an oil pressure pump. The pressure detection device 100 is fixed with bolts (not illustrated) passed through the metallic collars 46 of the fixers 44, and is fixed, in a sealed state, through a sealant which is not illustrated so that a fluid to be measured acts on the through-hole 13 of the base plate 10. The pressure sensor 20 is distorted (deformed) depending on a difference between the pressure of the fluid to be measured acting on the through-hole 13 and the pressure (reference pressure) of fluid (atmospheric air) in the pressure reference room PRR on the back of the pressure sensor 20, and the resistance value of the bridge circuit varies depending on the distortion (deformation), whereby an output voltage varies. The variation in output voltage is output as a measurement signal to the lead terminal 34 for an output. In other words, the pressure sensor 20 outputs a voltage signal corresponding to the pressure of the fluid to be measured.

A method for manufacturing the pressure detection device 100 including the above-described configuration will now be described.

First, insert molding of the base plate 10 and the lead terminals 30 is performed, and the housing 40 including the recessed portions 41, the capacitor holders 42, and the fixers 44 is formed. The pressure sensor 20 is fixed on the base 21. The base 21 is fixed on the base plate 10. The base 21 may be fixed on the base plate 10, followed by bonding the pressure sensor 20 to the base. The pressure sensor 20 and the lead terminals 30 are electrically connected to each other through the wires 31.

The capacitor bodies 51 and 51 are inserted from the opening of the back into the capacitor holders 42a and 42b. Each capacitor body 51 is fixed by the projections 47 and 47 and the wall 48. In addition, the leaders 52 of the capacitors 50 are inserted into the recessed portions 41a and 41b. The leaders 52 are fixed to the lead terminals 30 by welding, soldering, or the like.

The lid member 45 is airtightly fixed to the housing body 43 by laser welding.

The order of the above-described steps may be changed as appropriate, and plural steps may be concurrently executed.

The fixers 44 are fixed, with a bolt or the like, to a body to be detected.

Alternative Example

In the embodiment described above, the leaders 52 are disposed to extend from the capacitor body 51 and are linearly formed. However, this disclosure is not limited to the embodiment described above.

For example, the shape of a housing 40 is optional. For example, in the above-described embodiment, the shape with bilateral line symmetry has been illustrated as illustrated in FIG. 1. However, the shape and arrangement of each portion are optional.

For example, the shapes of a recessed portion 41 and a capacitor holder 42 are optional as long as a capacitor 50 can be mounted from the outside.

For example, the through-holes are formed in the recessed portions 41 in the embodiment described above. However, a recess opened to an undersurface is also acceptable instead of the through-holes. Plural through-holes and plural recesses may also be formed according to the number of the leaders 52 of the capacitor 50.

Figure 6:
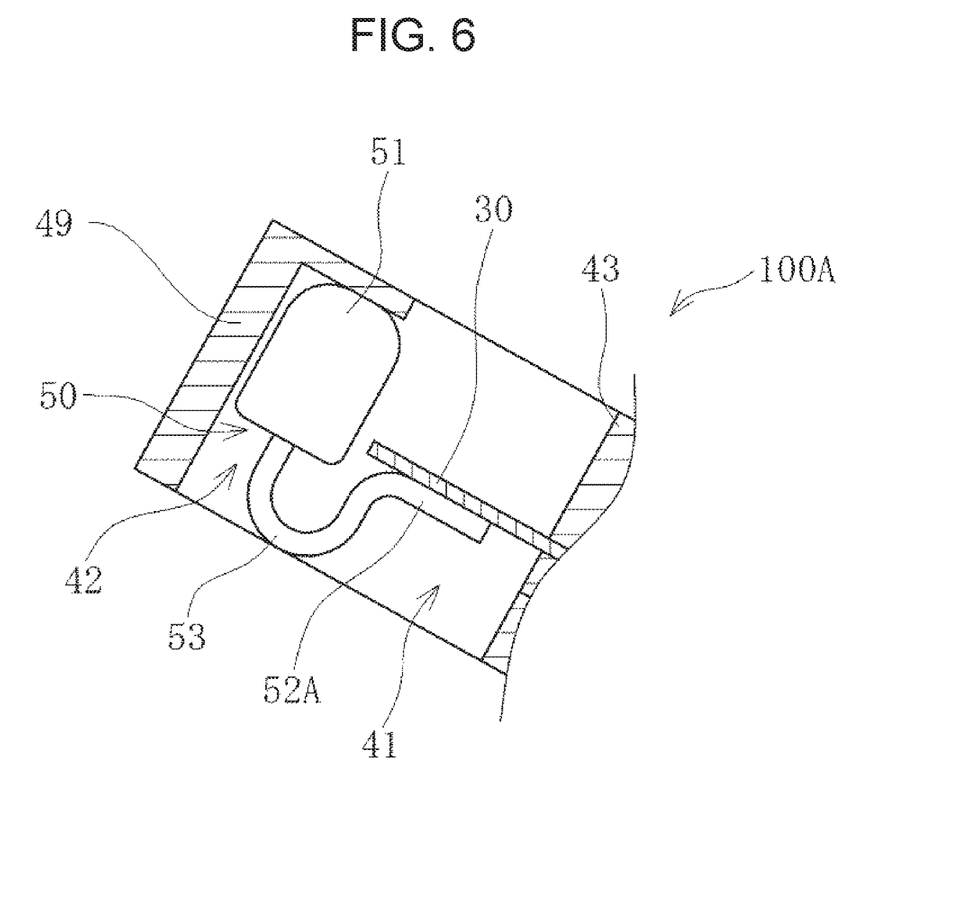
FIG. 6 is a partial cross-sectional view of a pressure detection device according to another embodiment.

The configuration in which the walls 48 are present on the back surfaces for the capacitor holders 42 has been illustrated. However, this disclosure is not limited to the configuration. The configuration is optional as long as the configuration includes an outwardly opened portion, the capacitor 50 can be mounted from the portion, and the mounted capacitor 50 can be retained. For example, a configuration including a side wall and a front wall 49 is also acceptable as illustrated in FIG. 6. In this configuration, a capacitor body 51 is inserted from the back surface of a housing 40 into a capacitor holder 42.

It is not necessary that a capacitor holder 42 has a size in which the whole of a capacitor body 51 can be housed. The size and configuration in which a part of the capacitor body 51 is housed are also acceptable. A method of fixing the capacitor body 51 to the capacitor holder 42 is not limited to pressing force, fitting, and the like, but is optional. For example, the capacitor body 51 may be fixed, with an adhesive, to the capacitor holder 42.

The longitudinal direction of the capacitor body 51 and the longitudinal direction of the leader 52 are allowed to be the same direction. However, the longitudinal direction of the capacitor body 51 and the longitudinal direction of the leader 52 may be allowed to be orthogonal to each other. For example, as illustrated in FIG. 6, a capacitor body 51 may be arranged in an upright position, and a leader 52 may be formed to extend in a horizontal direction orthogonal to the capacitor body 51 through a bend 53.

This configuration enables a recessed portion 41 and a capacitor holder 42 to be compact because the capacitor body 51, allowed to be in an upright position, is housed. Accordingly, a projection area can be reduced in the case of mounting a pressure detection device 100A to a body to be detected.

Like the already described pressure detection device 100, such a pressure detection device 100A can also detect a pressure and output the pressure as an electric signal.

In the pressure detection device 100, the recessed portions 41 are arranged at positions closer to the center of the housing body 43 with respect to the capacitor holders 42, the leaders 52 of the capacitors 50 are allowed to be closer to the center, and the capacitor bodies 51 are allowed to be closer to the outside (closer to the outer periphery). In the pressure detection device 100, however, the capacitor bodies 51 and leaders 52 of the capacitors 50 may be arranged to be reverse, whereby the capacitor bodies 51 may be located at a position closer to the center, and the leaders 52 may be arranged at a position closer to the outside (closer to the outer periphery). In such a manner, bonding operation such as welding of the leaders 52 and each of the lead terminals 32, 33, and 34 of the lead terminal 30 can be performed in the recessed portions 41 in the ends without being disturbed by the housing 40. The connectors for a power supply and for an output and the like can also be placed in the ends.

The pressure sensor 20 is not limited to a semiconductor-type pressure sensor. A known optional pressure sensor can be used as the pressure sensor 20. A technique for fixing the pressure sensor 20 to the base plate 10 is also optional. If the pressure reference room PRR can be formed, a method of fixing the lid member 45 to the holders is optional. A technique for connecting the pressure sensor 20 and the lead terminals 30 to each other is not limited to a technique using the wires 31 but is optional. The flat shapes of the lead terminals 30 (32 to 34) are optional as long as the lead terminals can be connected to the pressure sensor 20, and parts of the lead terminals are exposed in the recessed portions 41.

As described above, a pressure detection device 100 includes: a base plate 10 that includes a first principal surface 11, a second principal surface 12 located on the back of the first principal surface 11, and a through-hole 13 which penetrates the base plate from the first principal surface 11 to the second principal surface 12, and in which a fluid to be measured flows; a pressure sensor 20 that is arranged above the first principal surface 11 to cover the through-hole 13 of the base plate 10 and that outputs an electric signal corresponding to the pressure of the fluid to be measured in the through-hole 13; a lead terminal 30 that is electrically connected to the pressure sensor 20; a housing 40 that includes: a recessed portion 41 which retains the base plate 10 and the lead terminal 30, and which allows a part of the lead terminal 30 to be exposed; and a capacitor holder 42 which communicates with the recessed portion 41; and a capacitor 50 that protects the pressure sensor 20 from exogenous noise. The capacitor 50 can be mounted, from the outside, to the capacitor holder 42 which is outwardly opened. The leader 52 of the capacitor 50 mounted to the capacitor holder 42 is inserted into the recessed portion 41 and electrically connected to the lead terminal 30. In other words, the capacitor 50 held by the capacitor holder 42 is connected to the lead terminal 30 retained in the recessed portion 41. Accordingly, the capacitor 50 is disposed without using any circuit board, whereby proof stress against exogenous noise can be secured, the number of components can be reduced, and downsizing can be achieved. The lead terminal 30 and the capacitor 50 can be easily electrically connected to each other in the recessed portion 41. The mounting of the capacitor 50 can also be simplified by mounting the capacitor 50 from the outside of the housing 40.

In accordance with the pressure detection device 100 described above, the lead terminal 30 extends, to the outside of the base plate 10, toward a direction distanced from a central axis extending in the direction of penetrating the center of the through-hole 13. The recessed portion 41 is located outside the base plate 10 and communicates with the capacitor holder 42. Accordingly, the holding of the capacitor 50 in the capacitor holder 42 enables the capacitor 50 and the lead terminal 30 extending from the center of the base plate 10 toward the outside to be electrically connected to each other in the recessed portion 41 communicating with the capacitor holder 42.

In accordance with the pressure detection device 100 described above, the capacitor holder 42 and the recessed portion 41 are opened in a direction from the first principal surface 11 toward the second principal surface 12. Accordingly, the capacitor 50 can be mounted and can be electrically connected to the lead terminal 30, from the opened sides of the first principal surface 11 and the second principal surface 12.

In accordance with the pressure detection device 100 described above, the capacitor 50 includes a capacitor body 51 and a leader 52, and the capacitor body 51 is placed so that the longitudinal direction of the capacitor body 51 is along the extended line of the lead terminal 30. Accordingly, the capacitor body 51 and the leader 52 are linearly arranged, thereby being able to be held with a reduced thickness by the capacitor holder 42 and to reduce the thickness of the pressure detection device 100.

In accordance with the pressure detection device 100A of the present disclosure, the capacitor body 51 is placed so that the longitudinal direction of the capacitor body 51 is orthogonal to the extended line of the lead terminal 30. Accordingly, the full lengths of the capacitor body 51 and the leader 52A can be reduced, and a projection area in the case of mounting the pressure detection device 100 to a body to be measured can be reduced, thereby enabling compactness.

In accordance with the pressure detection device 100 of the present disclosure, the housing 40 includes a lid member 45 which forms a sealed pressure reference room PRR which covers the back surface of a surface, receiving the pressure of a fluid to be measured, of the pressure sensor 20. Accordingly, the pressure reference room PRR enables detection of a variation in pressure with respect to reference pressure.

In the embodiment described above, a case in which the base plate 10 has a discoidal shape has been described as an example. However, the shape of the base plate 10 is an optional shape such as a quadrangular shape if the pressure sensor 20 can be stably supported. The shapes of the base plate 10 and the housing 40 are not limited to planar shapes as long as being able to be brought into intimate contact with a body to be measured. A level difference may be disposed between the base plate 10 and the housing 40 so that packing mounted to the body to be measured can be reliably compressed. The one-chip semiconductor-type pressure sensor as the pressure sensor has been described as an example. However, the configuration of the pressure sensor is an optional configuration including another type.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-023709, filed on Feb. 10, 2016, the entire disclosure of which is incorporated by reference herein.

INDUSTRIAL APPLICABILITY

The present disclosure is suitable for a pressure detection device mounted to a speed change gear installed in a movable body such as an automobile, a motorcycle, or a ship.

REFERENCE SIGNS LIST

100 Pressure detection device
100A Pressure detection device
10 Base plate
11 First principal surface
12 Second principal surface
13 Through-hole
20 Pressure sensor
21 Base
30 Lead terminal
31 Wire
32 Lead terminal for power supply
33 Lead terminal for ground
34 Lead terminal for output
40 Housing
41 (42a, 41b) Recessed portion
42 (42a, 42b) Capacitor holder
43 Housing body
44 Fixer
45 Lid member
46 Metallic collar
47 Projection
48 Wall
50 Capacitor
51 Capacitor body
52 Leader
52A Leader
53 Bend
PRR Pressure reference room

The invention claimed is:

1. A pressure detection device comprising: a base plate that includes a first principal surface, a second principal surface located on a back of the first principal surface, and a through-hole in which a fluid to be measured flows, the through-hole penetrating the base plate from the first principal surface to the second principal surface; a pressure sensor that is arranged above the first principal surface to cover the through-hole of the base plate and outputs an electric signal corresponding to a pressure of the fluid to be measured in the through-hole; first and second lead terminals that are electrically connected to the pressure sensor; a housing that includes a recessed portion that retains the base plate and the first and second lead terminals and allows a part of each of the first and second lead terminals to be exposed; and first and second capacitor holders that each includes an outwardly opened recess and holds respective capacitors; and the capacitors that is held by the first and second capacitor holders of the housing are electrically connected to the lead terminals wherein each of the capacitor holders obliquely protrudes from an outer shape of the housing to both sides when viewed in a plan view in a direction from the first principal surface to the second principal surface.

2. The pressure detection device according to claim 1, wherein each of the lead terminals extends, to an outside of the base plate, toward a direction distanced from a central axis extending in a direction of penetrating a center of the through-hole, and obliquely extends from the outer shape of the housing to both sides when viewed in the plan view in the direction from the first principal surface to the second principal surface, and the recessed portion is located outside the base plate, communicates with the capacitor holders, and is obliquely formed from the outer shape of the housing to both sides when viewed in the plan view in the direction from the first principal surface to the second principal surface.

3. The pressure detection device according to claim 2, wherein the capacitor holders and the recessed portion are opened in a direction from the first principal surface toward the second principal surface, and are formed longer in a length of an aperture along an extended line of each of the lead terminals than in a depth of the aperture.

4. The pressure detection device according to claim 3, wherein the capacitors includes a capacitor body and a leader, and the capacitor body is inserted in the capacitor holders in a direction from the second principal surface toward the first principal surface, and is placed so that a longitudinal direction of the capacitor body is along an extended line of each of the lead terminals, and each of the capacitor holders is formed longer in a length of an aperture along the extended line of each of the lead terminals than in a depth of the aperture.

5. The pressure detection device according to claim 3, wherein the capacitors includes a capacitor body and a leader, and the capacitor body is inserted in the capacitor holders in a direction from the second principal surface toward the first principal surface, and is placed so that a longitudinal direction of the capacitor body is orthogonal to an extended line of each of the lead terminals.

6. The pressure detection device according to claim 3, wherein
- the housing includes a lid member that forms a pressure reference room that holds the pressure sensor, and
- the pressure reference room is arranged at a position equidistant from the first capacitor holder and the second capacitor holder.

7. The pressure detection device according to claim 2, wherein the capacitors includes a capacitor body and a leader, and the capacitor body is inserted in the capacitor holders in a direction from the second principal surface toward the first principal surface, and is placed so that a longitudinal direction of the capacitor body is along an extended line of each of the lead terminals, and each of the capacitor holders is formed longer in a length of an aperture along the extended line of each of the lead terminals than in a depth of the aperture.

8. The pressure detection device according to claim 7, wherein
- the housing includes a lid member that forms a pressure reference room that holds the pressure sensor, and
- the pressure reference room is arranged at a position equidistant from the first capacitor holder and the second capacitor holder.

9. The pressure detection device according to claim 2, wherein the capacitors includes a capacitor body and a leader, and the capacitor body is inserted in the capacitor holders in a direction from the second principal surface toward the first principal surface, and is placed so that a longitudinal direction of the capacitor body is orthogonal to an extended line of each of the lead terminals.

10. The pressure detection device according to claim 2, wherein
- the housing includes a lid member that forms a pressure reference room that holds the pressure sensor, and
- the pressure reference room is arranged at a position equidistant from the first capacitor holder and the second capacitor holder.

11. The pressure detection device according to claim 1, wherein
- the first and second capacitor holders and the recessed portion are opened in a direction from the first principal surface toward the second principal surface, and are formed longer in a length of an aperture along an extended line of each of the lead terminals than in a depth of the aperture.

12. The pressure detection device according to claim 11, wherein the capacitors includes a capacitor body and a leader, and the capacitor body is inserted in the capacitor holders in a direction from the second principal surface toward the first principal surface, and is placed so that a longitudinal direction of the capacitor body is along an extended line of each of the lead terminals, and each of the capacitor holders is formed longer in a length of an aperture along the extended line of each of the lead terminals than in a depth of the aperture.

13. The pressure detection device according to claim 11, wherein the capacitors includes a capacitor body and a leader, and the capacitor body is inserted in the capacitor holders in a direction from the second principal surface toward the first principal surface, and is placed so that a longitudinal direction of the capacitor body is orthogonal to an extended line of each of the lead terminals.

14. The pressure detection device according to claim 11, wherein
- the housing includes a lid member that forms a pressure reference room that holds the pressure sensor, and
- the pressure reference room is arranged at a position equidistant from the first capacitor holder and the second capacitor holder.

15. The pressure detection device according to claim 1, wherein the capacitors includes a capacitor body and a leader, and the capacitor body is inserted in the capacitor holders in a direction from the second principal surface toward the first principal surface, and is placed so that a longitudinal direction of the capacitor body is along an extended line of each of the lead terminals, and each of the capacitor holders is formed longer in a length of an aperture along the extended line of each of the lead terminals than in a depth of the aperture.

16. The pressure detection device according to claim 15, wherein
- the housing includes a lid member that forms a pressure reference room that holds the pressure sensor, and
- the pressure reference room is arranged at a position equidistant from the first capacitor holder and the second capacitor holder.

17. The pressure detection device according to claim 1, wherein the capacitors includes a capacitor body and a leader, and the capacitor body is inserted in the capacitor holders in a direction from the second principal surface toward the first principal surface, and is placed so that a longitudinal direction of the capacitor body is orthogonal to an extended line of each of the lead terminals.

18. The pressure detection device according to claim 17, wherein
- the housing includes a lid member that forms a pressure reference room that holds the pressure sensor, and
- the pressure reference room is arranged at a position equidistant from the first capacitor holder and the second capacitor holder.

19. The pressure detection device according to claim 1, wherein
- the housing includes a lid member that forms a pressure reference room that holds the pressure sensor, and
- the pressure reference room is arranged at a position equidistant from the first capacitor holder and the second capacitor holder.

* * * * *

UNITED STATES PATENT AND TRADEMARK OFFICE
CERTIFICATE OF CORRECTION

PATENT NO. : 10,935,448 B2
APPLICATION NO. : 16/075785
DATED : March 2, 2021
INVENTOR(S) : Yoshiyuki Kobayashi et al.

It is certified that error appears in the above-identified patent and that said Letters Patent is hereby corrected as shown below:

On the Title Page

Column 1, Item (73) Assignees:
Change "NIDEK TOSOK CORPORATION" to --NIDEC TOSOK CORPORATION--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*